United States Patent [19]
Faulk

[11] Patent Number: 5,929,606
[45] Date of Patent: Jul. 27, 1999

[54] RIPPLE-SUPPRESSED CONVERTING BATTERY MODULE

[75] Inventor: Richard A. Faulk, Cypress, Tex.

[73] Assignee: Compaq Computer Corporation, Houston, Tex.

[21] Appl. No.: 08/921,238

[22] Filed: Aug. 29, 1997

[51] Int. Cl.$^6$ ............................................ H01M 10/46
[52] U.S. Cl. ............................................ 320/143; 320/146
[58] Field of Search ............................... 320/116, 123, 320/136, 140, 143, 146, FOR 111, FOR 112, FOR 148; 363/15, 16, 95

[56] References Cited

U.S. PATENT DOCUMENTS

| | | |
|---|---|---|
| 4,184,197 | 1/1980 | Cuk et al. . |
| 4,186,437 | 1/1980 | Cuk . |
| 4,257,087 | 3/1981 | Cuk . |
| 4,274,133 | 6/1981 | Cuk et al. . |
| 4,908,790 | 3/1990 | Little et al. ............................ 307/66 X |
| 5,030,128 | 7/1991 | Herron et al. ........................... 439/372 |
| 5,694,302 | 12/1997 | Faulk ....................................... 363/16 |

OTHER PUBLICATIONS

Finnie, J. Scot, "Extend Your Laptop's Battery Life", PC–Computing, vol. 5, No.4, pp. 174–178, Apr. 1992.

Byers, T.J., "Smart Software Extends Battery Life", PC World, vol. 10, No. 9, p. 120, Sep. 1992.

Gallant, John, "Power Management", EDN, vol. 37, No. 21, pp. 115–120, Oct. 15, 1992.

Dixon, Lloyd, "High Power Factor Preregulator Using the SEPIC Converter", Unitrode Seminar, May 1983.

"Making Every Watt Count", editor J. Child, Computer Design, vol. 32, No. 12, p. 67, Dec. 1993.

Weber, K.H.R., "Das Erstzschaltbild mehrerer gekoppelter Induktivitaten und die Streuresonanz beim Dreiwicklungsubertrager", Nachrichtentechnik–8 (1958) pp. 290–297.

Weber, Sam, Part 1: "Mobile Computing, Computer Design", Electronic Engineering Times No. 889, p. 37, Feb. 19, 1996.

Pressman, Abraham I., "Switching Power Supply Design", Sec. 11.7, pp. 422–425, 1991.

Billings, Keith, "Switchmode Power Supply Handbook", sec 8.5, p. 2.67, 1989.

Primary Examiner—Edward H. Tso
Attorney, Agent, or Firm—Robert Groover; Betty Formby

[57] ABSTRACT

A universal battery pack which contains an integral DC-DC switching power converter, with an asymmetric ripple-suppression topology which suppresses ripple at the power output terminals during discharging.

21 Claims, 3 Drawing Sheets

RIPPLE-SUPPRESSED CONVERTING BATTERY MODULE

BACKGROUND AND SUMMARY OF THE INVENTION

The present invention relates to voltage-converting battery modules, and to portable systems which include them.

Background: Battery Management

Currently the custom solutions to applications of rechargeable energy services are costly and inflexible. Chargers must be custom designed and cannot be interchanged. Batteries are unique for each application and have very unique charge and discharge characteristics. Complex algorithms are often used for charge/discharge control.

Recently some efforts have been made to standardize batteries, but they still require custom, highly specialized interface electronics. (Examples include the DuraCell PowerSmart™ battery models DR35 and DR121, Motorola battery models EP3656, and Molicell model ME202.) Even the "standards" that are being proposed are too unique and specialized, and require highly specialized interface electronics.

Background: Smart Battery Modules

In the 1990s some battery modules have included logic chips (either microcontrollers or programmed custom logic chips). These chips are used for charge/discharge control, communications, and related functions such as overtemperature and overcurrent monitoring, or for a "gas gauge" function which estimates battery life.

Background: Converting Battery Modules

A further development was introduced in the Fall of 1996 (less than one year before the effective filing date of the present application), when Compaq Computer Corporation shipped a battery module which included an integral DC-DC switching converter. The DC-DC converter provided precise regulation of the charging voltage applied to lithium-ion battery cells, and hence permitted lithium-ion compatibility to be retrofitted into a system which was not originally designed for it. (Specifically, this battery module was used with a system where the voltage regulation from the AC adapter was not precise enough to be a safe supply for charging lithium-ion batteries.)

Background: Electromagnetic Interference ("EMI")

In the U.S., FCC regulations limit the amount of electromagnetic radiation which can be emitted by an electronic device. For example, a switching power supply whose output varies during the switching cycle may emit radio interference at the switching frequency and at multiples of that frequency. Such radiation can be reduced by shielding or filtering, but is also affected by design choices.

Ripple-Suppressed Converting Battery Module

The present inventor has realized that suppression of noise from the switching converter in the battery module makes the system constraints even simpler. In particular, the present application teaches that ripple suppression is more important on the system side of the converter than on the battery side. The battery cells themselves have a significant capacitance at the switching frequencies typically used, and this capacitance will present a lower impedance to the AC component of the voltage into the battery, and thus help to suppress any ripple voltage applied to the battery.

For battery technologies (such as lithium-ion) which are highly sensitive to excess voltages across the electrochemistry of the cell, the charging voltage can optionally be controlled with respect to the maximum voltage on the battery (over the period of the switching frequency), rather than to any averaged voltage value.

A further teaching of the present application is that the reactance configuration in a voltage-converting battery module can be made more compact by splitting the inductor into two pieces, with one portion of the inductor connected as a series inductor on each of the two power connection lines.

Since the characteristics of the system into which the universal battery module are unknown, it cannot be assumed that the system will have good filtering or shielding to suppress electromagnetic interference ("EMI"). By using a converting battery module with ripple suppression on the system side (under both charge and discharge conditions, EMI due to ripple on the power bus is avoided.

Moreover, it cannot be assumed that the system into which the universal battery may be inserted will have good noise immunity. Thus the system-side ripple reduction of the innovative universal battery module helps to assure that noise problems are not likely to occur, even if the battery is inserted into a system which is very sensitive to noise.

This architecture provides many advantages, including at least the following:

- The ripple-suppressed universal battery module provides reduced risk of noise radiation from a system in which it is used.
- The ripple-suppressed universal battery module provides reduced risk of switching noise interference with a system in which it is used.
- The ripple-suppressed universal battery module can more easily be substituted into designs which were originally designed merely for DC batteries (rechargeable or primary).
- The ripple-suppressed universal battery module can be used with little or no passive filtering.
- The reduced need for filtering (either in the battery or in the system) saves precious weight and volume in portable computer systems.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
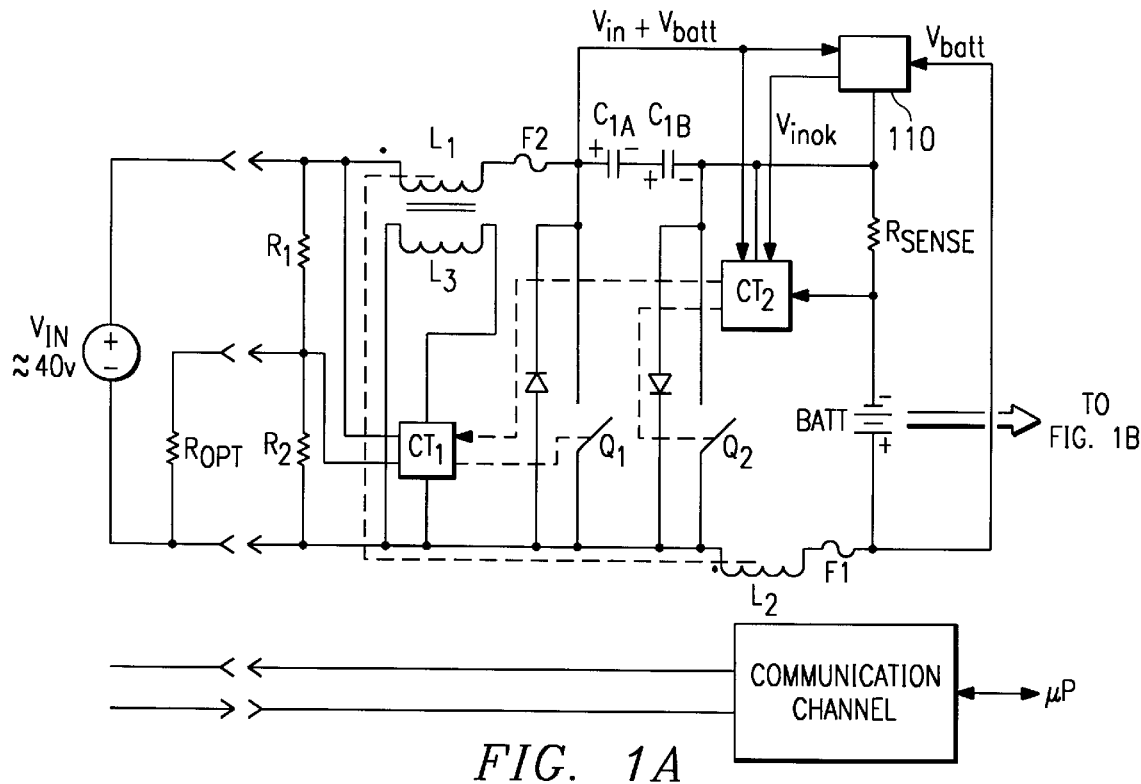
FIGS. 1A and 1B are two parts of a single figure, showing a sample battery controller board architecture of a sample innovative embodiment.
Figure 1B:
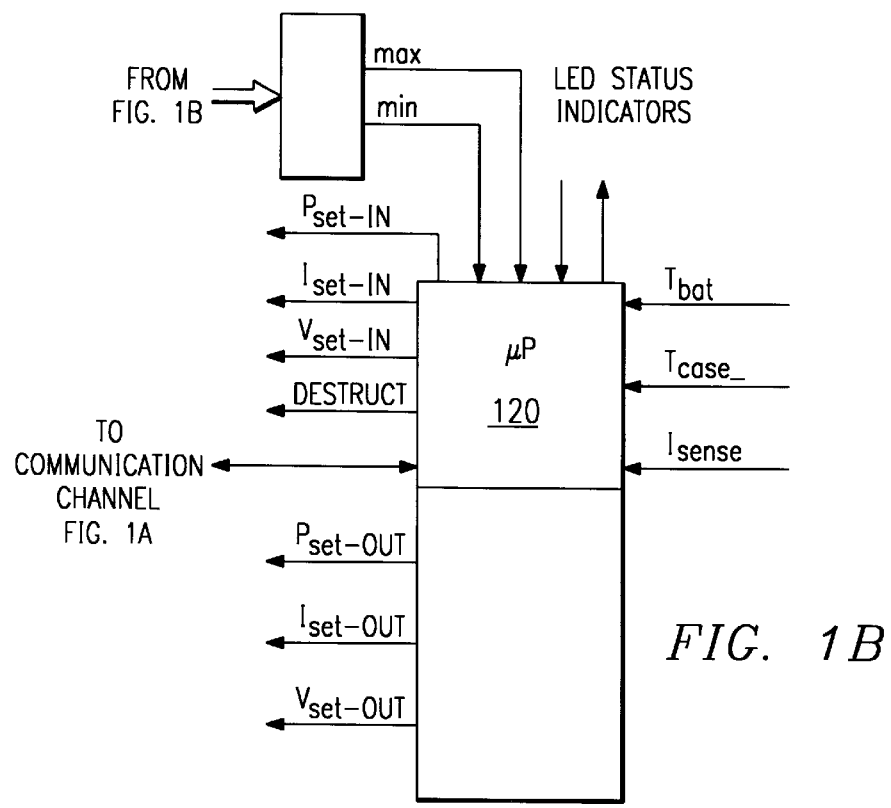

The numerous innovative teachings of the present application will be described with particular reference to the presently preferred embodiment (by way of example, and not of limitation), in which:

FIGS. 1A and 1B are two parts of a single figure, showing a sample battery controller board architecture. The particular topology shown provides ripple cancellation, but of course a variety of other topologies can be used instead.

Note that a polarity inversion occurs in the converter circuitry: the battery BATT is shown with its negative terminal uppermost.

The input connection to the positive side of voltage supply Vin is connected to the dotted end of inductor L1. The undotted end of inductor L1 is connected, through fuse F2, to the capacitor pair C1A/C1B. (This series-connected pair of capacitors is used for safety, since both capacitors would have to break down to create a DC pathway from the battery to Vin.) These are preferably polarized capacitors, and the undotted end of inductor L1 is preferably connected, through fuse F2, to the positive side of capacitor C1A.

The negative side of capacitor C1B is connected, through current-sensing resistor $R_{sense}$, to the negative terminal of the battery BATT. The positive terminal of the battery is connected, through fuse F1, to the undotted end of inductor L2. (Inductors L1 and L2 are coupled together, which reduces the total inductor mass, and also helps with ripple suppression as described below.) Inductors L1 and L2 preferably have equal values in this embodiment.

Switch Q1 is preferably a VDMOS power transistor, and when turned on will sink current from the undotted end of L1 to the negative side of Vin. The body diode of this transistor is also shown.

Switch Q2 too is preferably a VDMOS power transistor, and when turned on will sink current from the dotted end of L2 to the negative side of the battery. The body diode of this transistor is also shown.

Control circuit $CT_1$ controls switch Q1, and receives power from winding L3 which is inductively coupled to inductor L1. Control circuit $CT_1$ also receives a feedback voltage, from the voltage divider R1/R2/Ropt. Since the external resistor Ropt is connected as part of the voltage divider, its value will affect the value of the voltage ratio of this divider, and thus Ropt can change the voltage divider ratio into the error amplifier. This causes the regulated output voltage to shift, depending on the value of the external option resistor Ropt.

Control circuit $CT_2$ controls switch Q2, and receives a current-sensing input from sense resistor $R_{sense}$. The two control circuits $CT_1$ and $CT_2$ are synchronized, and indeed they do not have to be strictly separate. In normal operation, $CT_2$ provides a synchronous control signal to $CT_1$, so that $CT_1$ is slaved to $CT_2$.

Circuit 110 is a Vin testing circuit, which is more fully illustrated in FIG. 1C, and provides a signal to inhibit operation if Vin the battery voltage are both below limits.

FIG. 1B shows the connections of the microprocessor 120. The sense inputs include battery temperature Tbat, case temperature Tcase, and a current-sensing input Isense. The outputs $P_{set-IN}$, $I_{set-IN}$, $V_{set-IN}$, $P_{set-OUT}$, $I_{set-OUT}$, and $V_{set-OUT}$ provide setpoint signals to the real-time control loops which operate the converter. Specifically, output $P_{set-IN}$ determines the maximum-power setting under charging conditions, output $I_{set-IN}$ determines the maximum-current setting under charging conditions, output $V_{set-IN}$ determines the voltage setting under charging conditions, output $P_{set-OUT}$ determines the maximum-power setting under discharging conditions, output $I_{set-OUT}$ determines the maximum-current setting under discharging conditions, and output $V_{set-OUT}$ determines the voltage setting under discharging conditions. Communications between the system microprocessor and the innovative battery module microcontroller is by way of a communications channel circuit COMM CHANNEL.

Figure 1C:
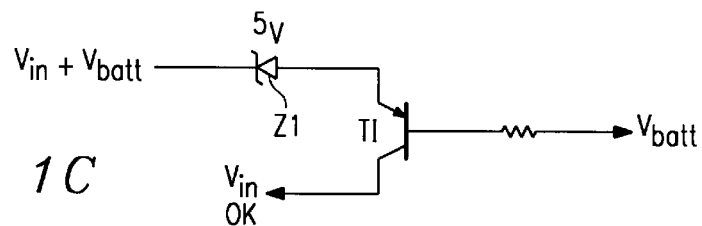
FIG. 1C shows a sample implementation of the Vin test circuitry in FIG. 1A.

FIG. 1C shows a very simple implementation of the Vin testing circuit 110. Zener Z1, in the presently preferred embodiment, provides a drop of 5V on the emitter of transistor T1. (The total drop is increased by one diode drop, and thus equals about 5.8V.) As shown in FIG. 1A, the capacitor (pair) C1A+C1B has an average voltage drop of Vin+Vbatt, so if Vin is not up to Vz+Vbe then the enable signal VinOK will not be active, and power will not be drawn from the external supply. (Of course, other circuit configurations can be used to change this voltage threshold.)

Figure 3:
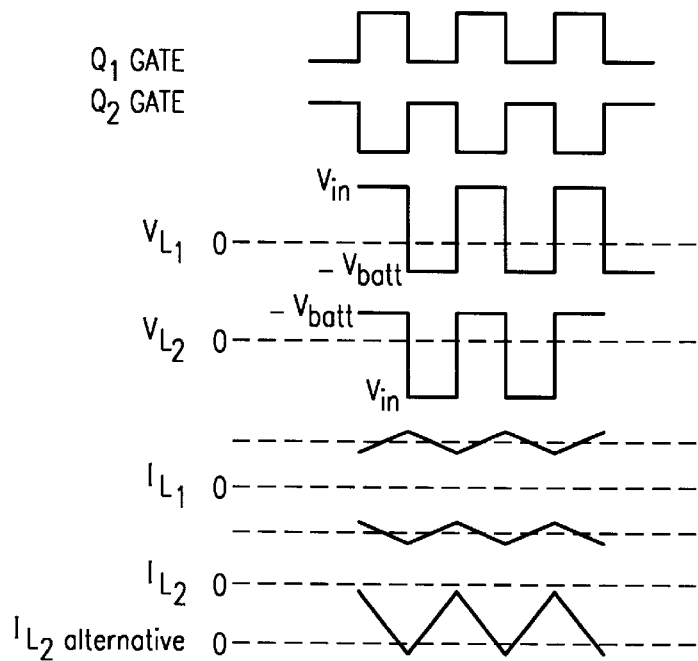
FIG. 3 shows waveforms during operation of the circuit of FIGS. 1A–1B.

FIG. 3 shows waveforms during operation of the circuit of FIGS. 1A–1B. The example shown is continuous operation, but of course discontinuous operation can also be used. As the top two lines of this Figure show, the gates of Q1 and Q2 are switched in opposition. When Q1 turns off (and Q2 turns on), the voltage on inductor L1 drops from Vin to −Vbatt, and the voltage on inductor L2 rises from −Vbatt to Vin. At this time the current $I_{L1}$ on inductor L1 begins to ramp down, and the current $I_{L2}$ on inductor L2 begins to ramp up. In the example shown by the solid trace, the current $I_{L1}$ varies around an average value of Pin over Vin, and the current $I_{L2}$ varies around an average value of Pbatt over Vbatt. (Pin and Pbatt represent the power flow at the external terminals and the electrochemical cells respectively, and will be equal apart from losses.) The bottom trace of FIG. 3 shows an alternative embodiment, in which $I_{L2}$ goes negative for a brief part of each cycle. This negative excursion can be used to recover energy stored on the switch capacitance, and thus provide zero-voltage switching.

It should be noted that this converter topology simply maintains a certain voltage ratio between the input and output terminals, regardless of the direction of power flow. (The control loop refines and stabilizes the precision and transient response, and allows current control and regulation.)

In the top two lines of FIG. 3, the duty cycles of Q1 and Q2 are approximately equal. However, by shifting the duty cycles, the voltage conversion ratio can be changed. The duty cycles for a given voltage ratio result from the condition that volt-seconds must balance: Q1's on-time ($T_{Q1on}$) times Vin will be equal to Q2's on-time ($T_{Q2on}$) times Vbatt.

$$\frac{V_{in}}{V_{batt}} = \frac{T_{Q2on}}{T_{Q1on}}$$

Thus to increase Vin, we increase Q2's on-time and reduce Q1's on-time.

In FIG. 3, it can also be seen that the AC component of the current on L2 is larger than the AC component of the current on L1. This shows asymmetrical ripple-steering, with a larger ripple reduction on L1 than on L2. By adjusting the coupling between the two inductors, the current ripple on L1 can be reduced to zero. In this case $I_{L1}$ will be a constant, as shown by the dashed lines in the $I_{L1}$ trace. (The voltage on $I_{L1}$ will still have an AC component, but the current will not.) In this case the ripple seen by the battery (on L2) would be increased, but in many cases, as discussed above, current ripple seen by the battery is less harmful than current ripple seen by the system. (Alternatively, the inductive coupling can be adjusted to steer the ripple onto L1 instead of L2, but this is less preferable.)

Figure 2:
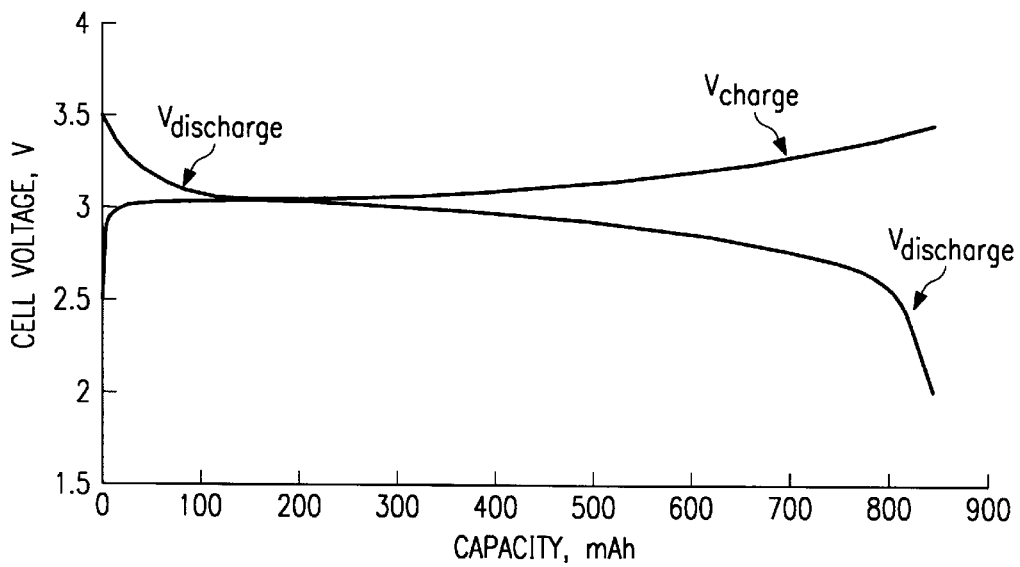
FIG. 2 shows an example of battery charge and discharge curves.

FIG. 2 shows an example of battery charge and discharge voltage curves. This specific example is taken from a AA-size Li/MnO$_2$ rechargeable battery of 850 mAh charge capacity, but is shown merely to illustrate general principles of charge/discharge management. Use of a larger or smaller cell size will change the horizontal scale of the curve, and use of multiple cells in series will change the vertical scale of the curve. Moreover, use of a different cell technology will change the shape of the curve.

A key point to observe about these curves is that they are not flat. (Discharge curves for other rechargeable battery technologies can be even less flat.) Note that the discharge voltage $V_{discharge}$ declines sharply from its initial value of about 3.4V, and reaches about 3V after about 150 mAh of discharge (18% of charge capacity). Thereafter the discharge voltage declines steadily until it reaches about 2.75V after about 650 mAh (76%) of discharge, and about 2.5V after about 800 mAh (94%) of discharge.

Currently, most complex electronic systems use a high-efficiency DC-DC converter to efficiently exploit the energy of the electrochemical cell despite the voltage changes during discharge. However, some of the simpler appliances which the disclosed universal battery can optionally power do not include such converters. Thus in such applications the universal battery can significantly improve the energy available from a given electrochemical cell. Even in systems which do include DC-DC converters, the regulated voltage of the universal battery permit the converters to be optimized for a single input voltage.

Note that the charging curve $V_{charge}$ is also not flat. Optimally efficient charging is usually less important than optimally efficient discharging, but the present invention permits charging too to be fully optimized if desired. This capability can be used to implement a variety of complex procedures for optimal charging.

Figure 4:
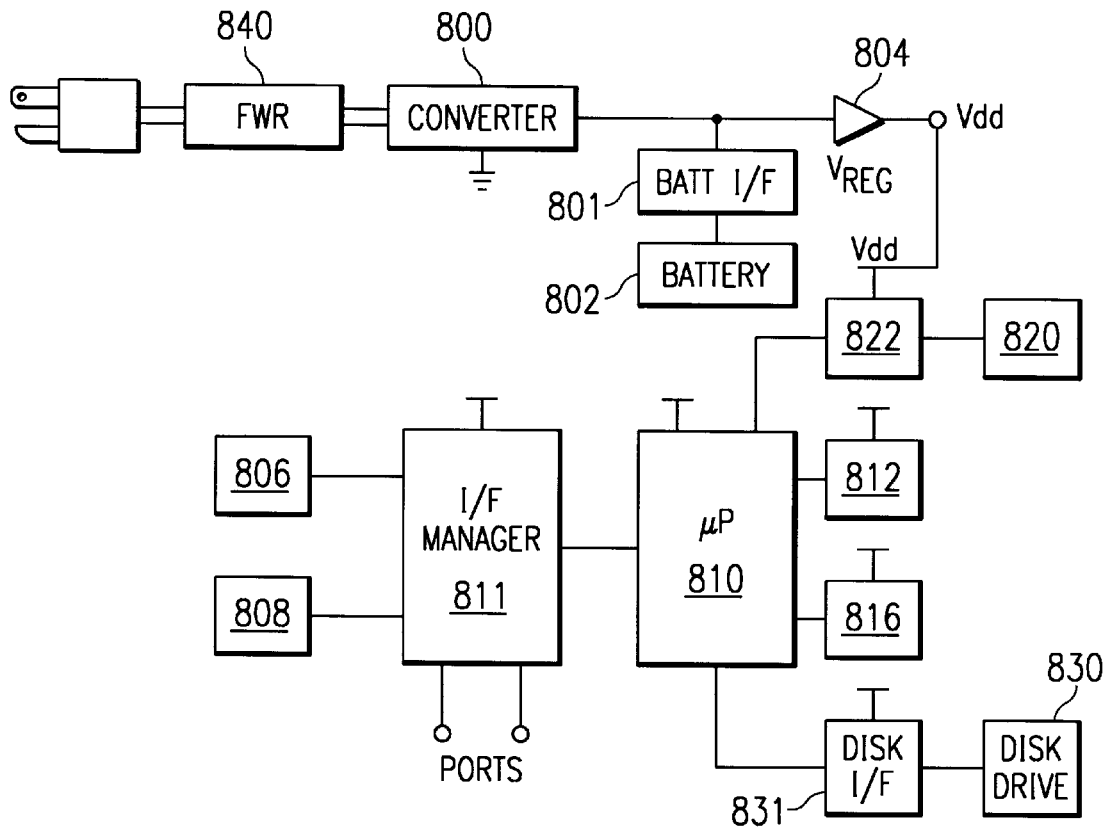
FIG. 4 shows a sample computer system incorporating the innovative architecture of FIG. 1.

FIG. 4 shows a sample computer system incorporating the innovative architecture of FIG. 1. This example is a portable computer system which includes a power converter 800 which is used to charge the battery 802, which contains the integral regulator. Optionally, a battery interface 801 is interposed between the battery and the rest of the circuitry. The power converter is connected, through a full-wave bridge rectifier 840, to draw power from AC mains, and is connected to provide a DC voltage to the battery. The battery 802 (or the converter 800), connected through a voltage regulator 804, is able to power the complete portable computer system, which includes, in this example: user input devices (e.g. keyboard 806 and mouse 808);

- at least one microprocessor 810 which is operatively connected to receive inputs from said input device, through an interface manager chip 811 (which also provides an interface to the various ports);
- a memory (e.g. flash memory 812 and RAM 816), which is accessible by the microprocessor;
- a data output device (e.g. display 820 and display driver card 822) which is connected to output data generated by microprocessor; and
- a magnetic disk drive 830 which is read-write accessible, through an interface unit 831, by the microprocessor.

Optionally, of course, many other components can be included, and this configuration is not definitive by any means.

Figure 5:
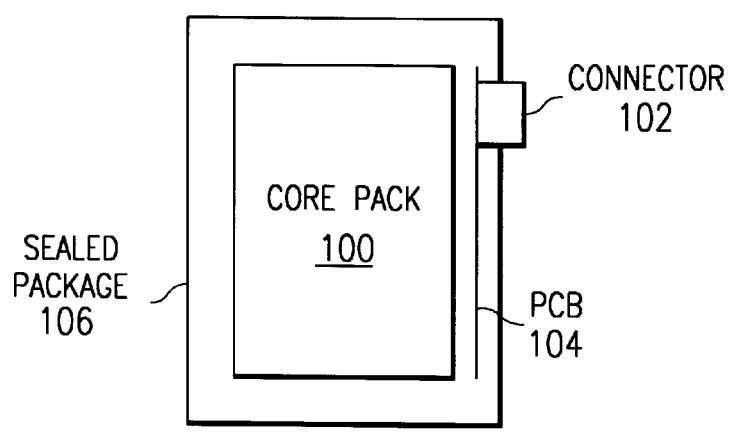
FIG. 5 shows a sample physical configuration of the universal battery module.

FIG. 5 shows a sample physical configuration of the universal battery module. The core pack 100 of electrochemical cells (preferably electrically connected in series, or alternatively in a series-parallel configuration) is mechanically and electrically connected to a small printed circuit board ("PCB") 104. Both the core 100 and the circuit board 104 are enclosed in a sealed package 106. (The sealed package 106, in this example, is not a totally hermetic seal, but is a sufficiently good seal to provide some protection against moisture and dirt.) A connector 102 extends from the board 104 out through the package 106, and provides terminals for connection to a mating connector in the computer system.

According to a disclosed class of innovative embodiments, there is provided: A battery pack subsystem, comprising: one or more electrochemical cells; and a switching voltage converter which is connected to selectably control the voltage ratio between said cells and said external terminals; said converter having an asymmetrical ripple-suppressing configuration which suppresses switching noise on said external terminals, and which does not suppress switching noise on said cells to the same extent as on said external terminals; said converter and said battery cells being packaged together as a single integral unit.

According to another disclosed class of innovative embodiments, there is provided: A battery pack subsystem, comprising: one or more electrochemical cells; and a switching voltage converter which is connected to selectably control the voltage ratio between said cells and external terminals; said converter having an ripple-suppressing configuration in which AC current components are suppressed on said external terminals; said converter and said cells being packaged together as a single integral unit.

According to another disclosed class of innovative embodiments, there is provided: A battery pack subsystem, comprising: external power terminals; one or more electrochemical cells; and a switching voltage converter which is connected to selectably transfer power, with a selectable voltage ratio, between said cells and said external terminals; said converter including a first discrete inductor connected to a first connection of said cells, and a second discrete inductor connected to a second connection of said cells; said first and second discrete inductors being inductively coupled together; said converter and said cells being packaged together as a single integral unit.

According to another disclosed class of innovative embodiments, there is provided: A computer system comprising: a computer, comprising memory and a programmable processor, integrated in a common portable chassis; a power bus which is connected to supply power to said programmable processor at a first voltage; a power supply which is connected to supply power to said power bus; and a rechargeable battery module, including a set of one or more rechargeable electrochemical cells, connected to said power bus; wherein no noise filtering is performed between said battery pack subsystem and components which are powered by said battery pack subsystem.

According to another disclosed class of innovative embodiments, there is provided: A method for operating a portable electronic system, comprising the step of: connecting the power output terminals of a detachable battery module directly to a power bus which powers integrated circuits including programmable logic; wherein no noise filtering is performed between said battery pack subsystem and components which are powered by said battery pack subsystem.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The programmability provided by the disclosed architecture permits a vast range of control algorithms to be implemented. For example, the output voltage can be varied, if desired, in accordance with control signals received from an application controller. This capability can be useful, for example, to permit data retention lifetime in sleep mode to be maximized.

For another example, one of the control options is the apparent source impedance of the battery. That is, when the load is drawing maximum current, the voltage of a battery will typically sag somewhat (due to the internal resistance of the battery conduction path, and due to less efficient electrochemical reactions at high current density). The degree to which voltage sags as current increases can be described by a number called "source impedance." One of the options which can be programmed into the universal battery module described above is a programmable source impedance (within limits set by the maximum power output of the battery and the maximum power-handling capability of the converter circuit.

For another example, the converter circuit configuration can be modified to provide multiple isolated outputs at different voltages, if desired.

The integrated converter topology shown is especially advantageous, but is not the only topology which can be used. For example, a simple buck-boost converter topology can also be used. Alternatively and thus preferably, many other converter topologies can also be used, as detailed in the books cited below.

Preferably the converter topology is fully bidirectional, so that the battery voltage can be above or below the system voltage; but this is not strictly necessary.

Operation of the battery at a high voltage increases the required ratings on the switching transistor, and increases the potential loss on the transistors. However, if the converter's topology is chosen so that the switching transistors operate with zero voltage switching (or close to it), this source of inefficiency can be reduced or nearly eliminated.

Alternatively, if the battery cell configuration is chosen to operate at lower voltage (and hence higher current for a given output power), resistive losses will increase, and these are not as easy to reduce. A further disadvantage with operating in the high-current regime is that, even if the switching transistors are made very large to reduce resistive losses due to $R_{ds\text{-}ON}$, heat sinking may still be necessary at some level of current, and heat sinking is difficult to do in a battery module.

A further advantage of the high voltage configuration is that the individual cell voltages can more easily be monitored. It is common in lithium-ion cell batteries to monitor voltages at the individual nodes in a serious connection. However, where cells are connected in a series-parallel configuration, there is no way to distinguish between the cell voltages of the parallel-connected cells.

For another example, the converter topology can alternatively be configured for boost-in, buck-out. For a given total energy this permits use of a purely series-connected stack of cells, if desired. This avoids the problems of reverse-biased cells, which can occasionally occur with series-parallel batteries under worst-case conditions.

For another example, for ultrasonic transducer applications a modified circuit configuration can be used to provide ultrasonic drive power directly from the battery module if desired.

For another example, for communications applications a modified circuit configuration can even be used to provide an RF signal output from the battery module (at VLF or higher frequencies) if desired. Optionally, this RF output can be modulated by an external control signal if desired.

For another example, a modified circuit configuration can even be used to provide an AC power output from the battery module if desired.

For another example, a very-low-power wireless data link can optionally be used to provide some communication between the battery module and the application or system.

For another example, within the constraints well-known to those of ordinary skill, power MOS transistors can be replaced by IGBT and/or MCT devices, with appropriate allowance for reduced turn-off times. In some applications power bipolar devices can also be used.

Alternatively a small passive filtering stage can be used in the battery module, although this is not used in the presently preferred embodiment.

The following background publications provide additional detail regarding possible implementations of the disclosed embodiments, and of modifications and variations thereof. See generally Pressman, SWITCHING POWER SUPPLY DESIGN (1991); the 3 volumes of Middlebrook and Cuk, ADVANCES IN SWITCHED-MODE POWER CONVERSION (2.ed. 1983); and all of the biennial UNITRODE POWER SUPPLY DESIGN SEMINAR HANDBOOKS; all of which are hereby incorporated by reference.

What is claimed is:

1. A battery pack subsystem, comprising:
   one or more electrochemical cells; and
   a switching voltage converter which is connected to selectably control the voltage ratio between said cells and said external terminals;
   said converter having an asymmetrical ripple-suppressing configuration which suppresses switching noise on said external terminals, and which does not suppress switching noise on said cells to the same extent as on said external terminals;
   said converter and said battery cells being packaged together as a single integral unit.

2. The battery pack subsystem of claim 1, wherein no noise filtering is performed between said battery pack subsystem and components which are powered by said battery pack subsystem.

3. The battery pack subsystem of claim 1, wherein said electrochemical cells are lithium-ion cells.

4. The battery pack subsystem of claim 1, wherein said converter includes two transistors which are switched in alternation, and said voltage ratio is adjusted by adjusting the duty cycle ratio of said transistors.

5. The battery pack subsystem of claim 1, wherein said converter is DC-isolated by a capacitor.

6. The battery pack subsystem of claim 1, wherein said converter is DC-isolated by a capacitor and not by any transformer.

7. The battery pack subsystem of claim 1, wherein said converter includes a first inductor connected to control current at said external terminals, and a second inductor connected to control current at said cells, and the inductive coupling between said first and second inductors is adjusted to minimize the AC current component on said first inductor.

8. A battery pack subsystem, comprising:
   one or more electrochemical cells; and
   a switching voltage converter which is connected to selectably control the voltage ratio between said cells and external terminals;

said converter having an ripple-suppressing configuration in which AC current components are suppressed on said external terminals;

said converter and said cells being packaged together as a single integral unit.

9. The battery pack subsystem of claim 8, wherein no noise filtering is performed between said battery pack subsystem and components which are powered by said battery pack subsystem.

10. The battery pack subsystem of claim 8, wherein said electrochemical cells are lithium-ion cells.

11. The battery pack subsystem of claim 8, wherein said converter includes two transistors which are switched in alternation, and said voltage ratio is adjusted by adjusting the duty cycle ratio of said transistors.

12. The battery pack subsystem of claim 8, wherein said converter is DC-isolated by a capacitor.

13. The battery pack subsystem of claim 8, wherein said converter is DC-isolated by a capacitor and not by any transformer.

14. The battery pack subsystem of claim 8, wherein said converter includes a first inductor connected to control current at said external terminals, and a second inductor connected to control current at said cells, and the inductive coupling between said first and second inductors is adjusted to minimize the AC current component on said first inductor.

15. A battery pack subsystem, comprising:

external power terminals;

one or more electrochemical cells; and a switching voltage converter which is connected to selectably transfer power, with a selectable voltage ratio, between said cells and said external terminals;

said converter including a first discrete inductor connected to a first connection of said cells, and a second discrete inductor connected to a second connection of said cells;

said first and second discrete inductors being inductively coupled together;

said converter and said cells being packaged together as a single integral unit.

16. The battery pack subsystem of claim 15, wherein no noise filtering is performed between said battery pack subsystem and components which are powered by said battery pack subsystem.

17. The battery pack subsystem of claim 15, wherein said electrochemical cells are lithium-ion cells.

18. The battery pack subsystem of claim 15, wherein said converter includes two transistors which are switched in alternation, and said voltage ratio is adjusted by adjusting the duty cycle ratio of said transistors.

19. The battery pack subsystem of claim 15, wherein said converter is DC-isolated by a capacitor.

20. The battery pack subsystem of claim 15, wherein said converter is DC-isolated by a capacitor and not by any transformer.

21. The battery pack subsystem of claim 15, wherein said converter includes a first inductor connected to control current at said external terminals, and a second inductor connected to control current at said cells, and the inductive coupling between said first and second inductors is adjusted to minimize the AC current component on said first inductor.

* * * * *